(12) United States Patent
Broach

(10) Patent No.: US 7,307,412 B1
(45) Date of Patent: Dec. 11, 2007

(54) INDUCTIVE MEASUREMENT SYSTEM AND METHOD

(75) Inventor: Michael Eugene Broach, San Mateo, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 11/372,567

(22) Filed: Mar. 10, 2006

Related U.S. Application Data

(62) Division of application No. 10/703,960, filed on Nov. 7, 2003, now Pat. No. 7,042,207.

(51) Int. Cl.
    *G01R 15/18* (2006.01)
(52) U.S. Cl. .................................................. 324/117 R
(58) Field of Classification Search ........................ None
    See application file for complete search history.

(56) References Cited

U.S. PATENT DOCUMENTS

| | | | | |
|---|---|---|---|---|
| 4,403,279 A | * | 9/1983 | Hirsch et al. | 323/222 |
| 4,672,518 A | | 6/1987 | Murdock | 363/21 |
| 4,717,994 A | | 1/1988 | Diaz et al. | 363/21 |
| 4,837,495 A | | 6/1989 | Zansky | 323/222 |
| 4,975,820 A | | 12/1990 | Szepesi | 363/21 |
| 5,731,731 A | * | 3/1998 | Wilcox et al. | 327/403 |
| 5,903,452 A | | 5/1999 | Yang | 363/97 |
| 6,177,787 B1 | * | 1/2001 | Hobrecht | 323/283 |
| 6,282,111 B1 | | 8/2001 | Illingworth | 363/98 |
| 6,487,099 B1 | | 11/2002 | Perkins et al. | 363/98 |
| 6,661,224 B1 | * | 12/2003 | Linder | 324/227 |
| 6,778,665 B1 | * | 8/2004 | Fischer et al. | 379/413 |
| 6,828,766 B2 | * | 12/2004 | Corva et al. | 323/284 |
| 6,841,979 B2 | * | 1/2005 | Berson et al. | 323/282 |
| 7,042,207 B1 | * | 5/2006 | Broach | 324/117 R |

OTHER PUBLICATIONS

C. K. Tse, et al., "Control of Bifurcation in Current-Programmed DC/DC Converters: A Reexamination of Slope Compensation," *IEEE International Symposium on Circuits and Systems Geneva 2000*, May 28-31, 2000, vol. 4—pp. 671-674.

(Continued)

*Primary Examiner*—Jermele Hollington
(74) *Attorney, Agent, or Firm*—Brett A. Hertzberg; Merchant & Gould

(57) ABSTRACT

A system and method measures parameters associated with an inductor such as in a switching converter. The inductance value can be determined by monitoring voltages and currents associated with the inductor when a measurement mode is activated. In one example, the measurement is provided by a signal processing system that includes an analog differentiator. In another example, the measurement is provided by a signal processing system that converts the analog measurement voltages into digital quantities that are analyzed in the digital domain. The value of the inductance value is determined by calculating of $\Delta V_L$ and $\Delta I_L/\Delta t$. The saturation point in the inductance is located by measuring the change in slew rate of the inductance during the measurement mode. Average values for the inductor and the slew rate can be determined using digital techniques. Other parameters such as current limit and on-time of the inductor can be adjusted by this methodology.

19 Claims, 6 Drawing Sheets

OTHER PUBLICATIONS

C. K. Tse, et al., "Control of Bifurcation in Current-Programmed DC/DC Converters: An Alternative Viewpoint of Ramp Compensation," *IEEE 26th Annual Conference of Industrial Electronics Society*, Oct. 22-28, 2000, vol. 4—pp. 2413-2418.

Chung-Chieh Fang, "Exact Orbital Stability Analysis of Static and Dynamic Ramp compensations in DC-DC Converters," *IEEE International Symposium on Industrial Electronics*, Jun. 12-16, 2001, vol. 3, pp. 2124-2129.

\* cited by examiner

INDUCTIVE MEASUREMENT SYSTEM AND METHOD

This patent application is a divisional application of U.S. patent application Ser. No. 10/703,960, filed on Nov. 7, 2003, now U.S. Pat. No. 7,024,207 entitled "INDUCTIVE MEASUREMENT SYSTEM AND METHOD", which is hereby incorporated by reference.

FIELD OF THE INVENTION

The present invention relates to a system and method for detecting the saturation of an inductive component in a circuit. Slew rate of the inductive component can be monitored and/or measured to determine the saturation point for the core of the inductive component.

BACKGROUND OF THE INVENTION

Opposite polarity pulses can be applied to a transformer in a pulse-width-modulated (PWM) power converter. The secondary winding of the transformer is connected to additional circuitry such as a passive filter to generate an average output voltage. The average output voltage is related to the pulse-width by the volts-seconds rule and the characteristics of the transformer.

An example push-pull type PWM converter is illustrated in FIG. 1. As illustrated in FIG. 1, transformer T1 conducts current (IC1, IC2) from the BP power supply terminal through transistors Q1 and Q2. For example, the primary winding of transformer T1 conducts current IC1 when transistor Q1 is activated, while the primary winding of transformer T1 conducts current IC2 when transistor Q2 is activated. Diodes D1 and D2 operate on opposite polarity cycles to provide current (either ID1 or ID2) through inductor L to a load (not shown). Capacitor C0 is filter ripple in the output voltage (VO).

Ideally, transistors Q1 and Q2 are activated for equal amounts of time via drive signals DRV1 and DRV2 such that the volt-second integral of the pulses applied to the transformer corresponds to zero and the transformer core does not saturate. However, non-ideal switching times for transistors Q1 and Q2 may result in unequal cycle times such that the transformer core is driven into saturation. Core saturation in a PWM converter may result in secondary effects such as breakdown in the switching transistors (Q1, Q2), excessive voltage and current stress on the rectifier diodes (D1, D2), as well as EMI related problems.

BRIEF DESCRIPTION OF THE DRAWINGS

Non-limiting and non-exhaustive embodiments of the present invention are described with reference to the following drawings.

DETAILED DESCRIPTION OF THE PREFERRED EMBODIMENT

Figure 1:
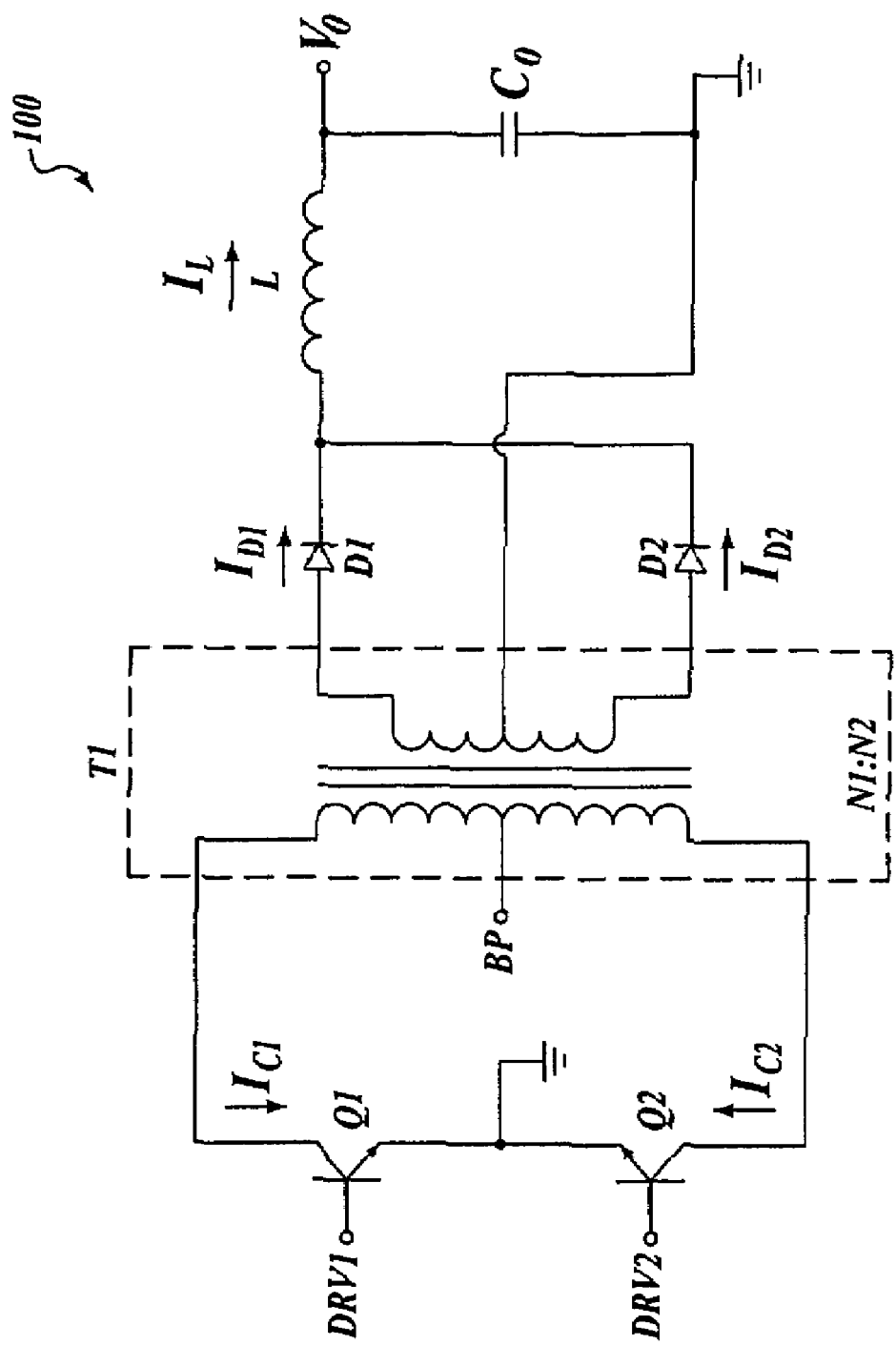
FIG. 1 is an illustration of a conventional push-pull type PWM converter.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other signal.

Briefly stated, the invention is related to a system and method measures parameters associated with an inductor such as in a switching converter. The inductance value can be determined by monitoring voltages and currents associated with the inductor when a measurement mode is activated. In one example, the measurement is provided by a signal processing system that includes an analog differentiator. In another example, the measurement is provided by a signal processing system that converts the analog measurement voltages into digital quantities that are analyzed in the digital domain. The value of the inductance value is determined by calculating of $\Delta V_L$ and $\Delta I_L/\Delta t$. The saturation point in the inductance is located by measuring the change in slew rate of the inductance during the measurement mode. Average values for the inductor and the slew rate can be determined using digital techniques. Other parameters such as current limit and on-time of the inductor can be adjusted by this methodology.

Inductors in switching electronic circuits are typically made out of ferrites or some other core material that has a higher permittivity than air. Unlike air core inductors, the amount of current flowing in these inductors is constrained by the quality and quantity of the core material. Once the inductor's operating current exceeds a saturation point, the inductor's effectiveness is reduced and the rate of increase in the current relative to the applied voltage rises measurably. The inductor voltage ($V_L$) and the inductor current ($I_L$) are related to one another by: $\Delta I_L/\Delta t = \Delta V_L/L$.

Magnetic load applications such as motor drivers and switched-mode power supplied (SMPS) incorporate current limiting circuits to protect the control circuits (e.g., drivers, inductive elements, etc.) from currents that are sufficient to cause saturation and induce destructive currents. For example, in a SMPS the saturation current should always be greater than the current limit in the controller.

By detecting the slew rate change in the inductor current the saturation point of the inductor can be detected and an appropriate action (e.g., current limit activated) can be taken. In one example of the present invention, the slew rate of the voltage drop across the parasitic resistance of the inductor is monitored. In another example of the present invention, the slew rate of the voltage drop across a resistance in series with the inductor is monitored.

The various measurements of voltages and/or currents can be used to calculate values of characteristics associated with the inductor. Example characteristics include: inductor value, series resistance, slew rate in non-saturation, slew rate in saturation, as well as others. Inductors with different core materials have different characteristic curves (e.g., the saturation and non-saturation slew rates change based on the type of core material) such that the type of core material and the value of the inductor can be determined (e.g., a lookup table that identifies the core material type based on characteristic measurements). The characteristic measurements can also be used to in a control system such as in a switching-type converter (or regulator) to adaptively change control parameters such as: current limit, switching time, small signal compensation, and slope compensation.

Conventional circuits are often designed with various protection mechanisms to prevent damage to the circuits during operation. For example, switching circuits such as regulator and converters often have an associated current limit to protect the circuit from damage. In the present invention, characteristics associated with the inductor are measured and various control parameters associated with protection (e.g., slew rate limit, current limit, etc) in the circuit are dynamically adjusted by the control circuit to accommodate a wide range of inductor values and saturation ratings. In one example, a current limit is adjusted by dynamically adjusting a reference voltage in the control loop of the circuit using measured information. In another example, the current limit is adjusted by dynamically changing a current level in the control loop.

Conventional circuits often include compensation to prevent undesirable effects such as oscillations, or some other instability or non-linearity in the control loop. In the present invention, characteristics associated with the inductor are measured and various control parameters associated with compensation of the circuit are dynamically adjusted by the control circuit to accommodate a wide range of inductor values and saturation ratings. In one example, a parameter in the control loop is dynamically adjusted (e.g., additional current sources are enabled, a feedback amount is changed, a gain is adjusted, etc.) to change the small signal compensation associated with the inductor. In another example, a parameter in the control loop is dynamically adjusted based on the rate of discharge in the inductor to change the slope compensation for the inductor.

Figure 2:
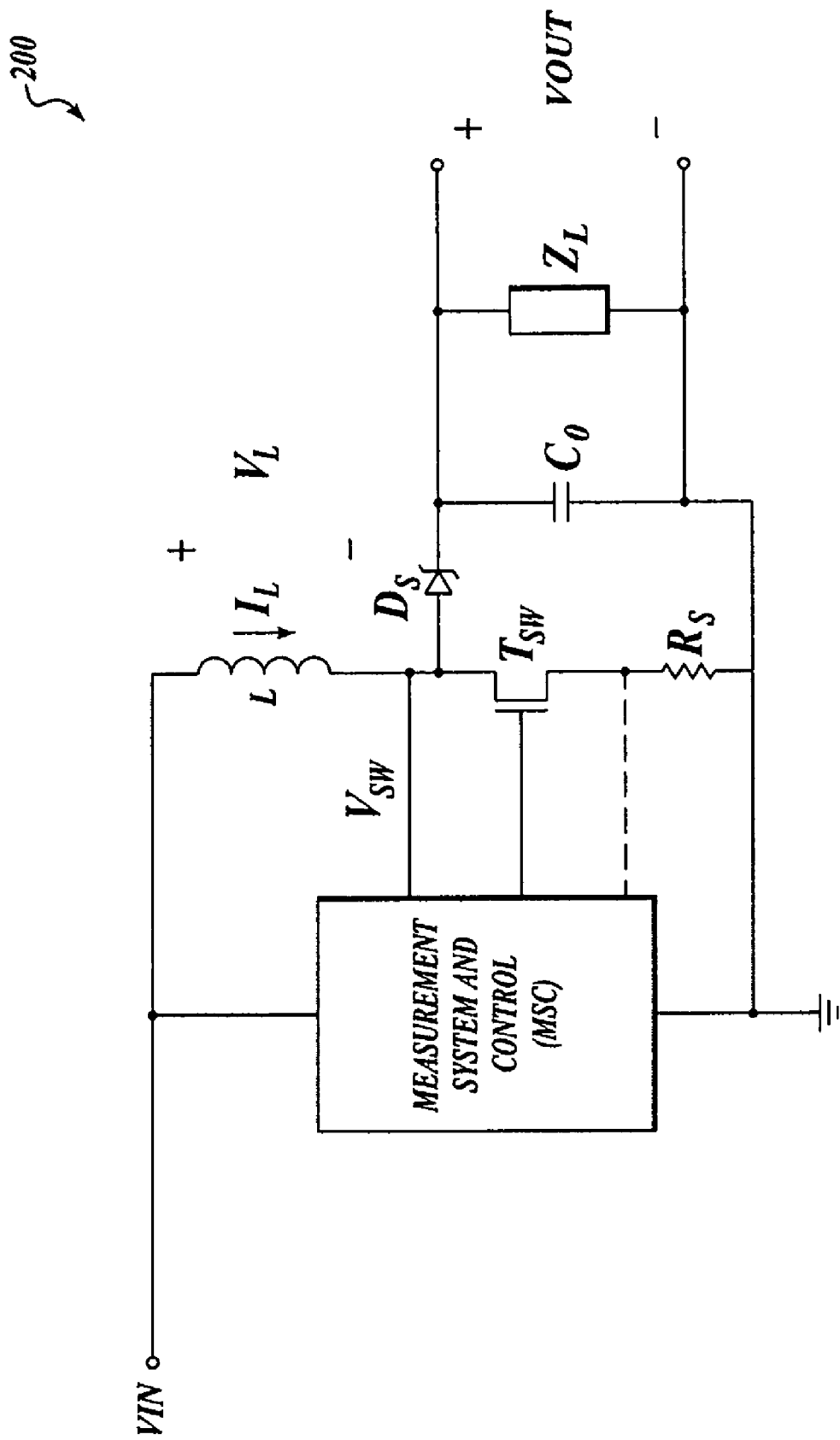
FIG. 2 is an illustration of an example embodiment of a switching converter.

FIG. 2 is an illustration of an example embodiment of a switching converter (200) that is arranged according to an aspect of the present invention. Switching converter 200 includes an inductor (L), a switching transistor ($T_{SW}$), a diode ($D_S$), a capacitor ($C_O$), a load circuit ($Z_L$), and a measurement and system control (MSC) block.

Inductor L is charged when switching transistor $T_{SW}$ is active. Inductor current ($I_L$) is delivered to capacitor $C_O$ and load circuit $Z_L$ via diode $D_S$ when transistor $T_{SW}$ is inactive. In a normal operating mode, the MSC block is arranged to actuate switching transistor $T_{SW}$ such that inductor L is periodically charged. The MSC block is further arranged to monitor the voltages and currents associated with inductor L when the switching converter 200 is operated in a measurement mode, and provides a measurement of the inductance value based on those measurements.

The change in inductor voltage ($\Delta V_L$) is determined by monitoring the input voltage ($V_{IN}$) and the switch voltage ($V_{SW}$). In one example embodiment, the change in inductor current ($\Delta I_L/\Delta t$) is determined by monitoring the change in voltage across the switching transistor ($\Delta V_{DS}$) and calculating: $(\Delta I_L/\Delta t)=(\Delta V_{DS}/\Delta t)/rdson$, where rdson is the on resistance of switching transistor $T_{SW}$. An optional resistor ($R_S$) may be placed in series with switching transistor $T_{SW}$ to facilitate measurement of the inductor current.

Figure 3:
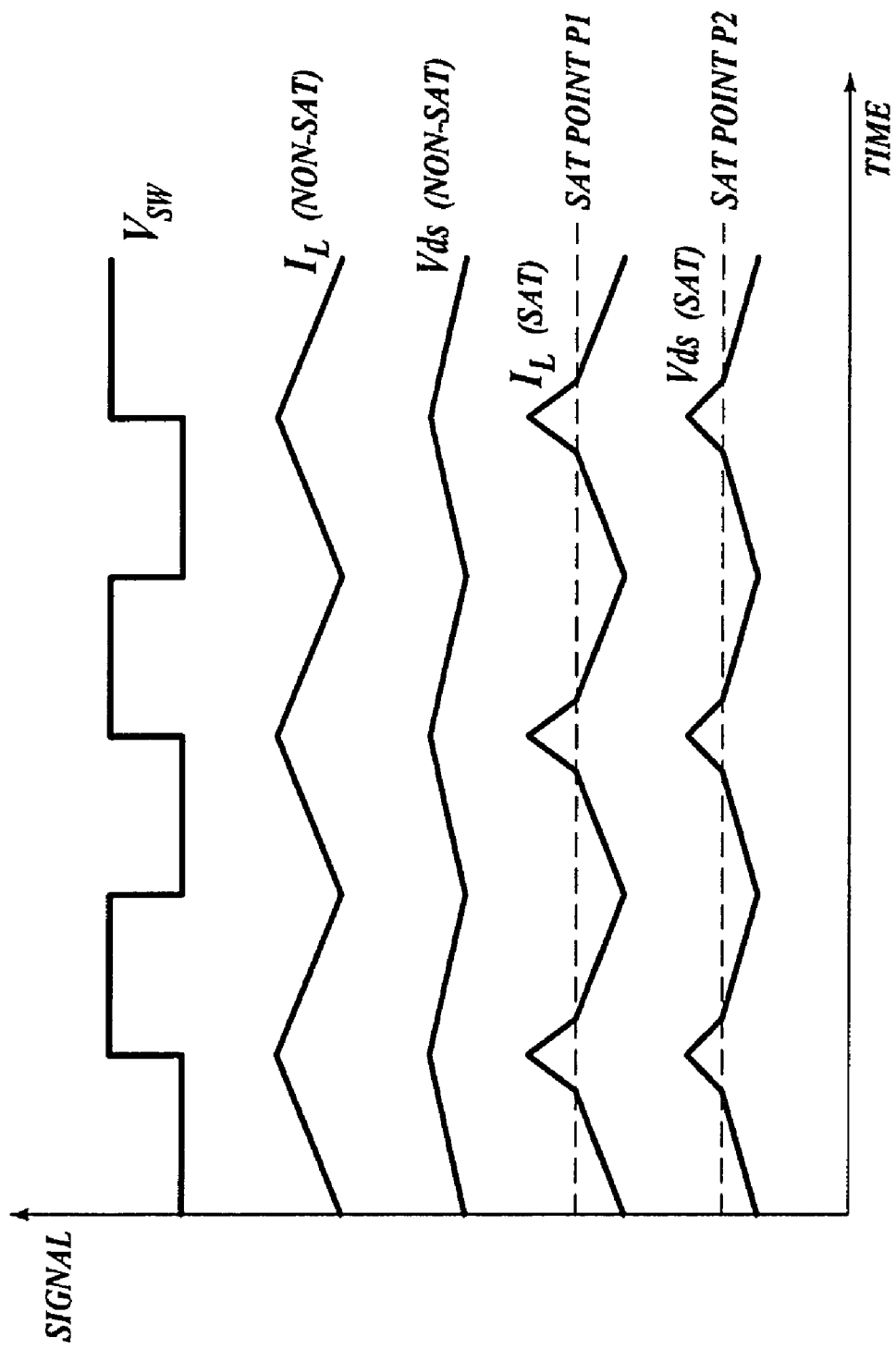
FIG. 3 is an illustration of example waveforms for a switching converter.

FIG. 3 is an illustration of example waveforms for a switching converter such as that illustrated in FIG. 2. Ideally, the inductor does not reach a saturation point and the inductor current ($I_L$) and the voltage across transistor $T_{SW}$ ($V_{DS}$) linearly change proportional to the value of the inductor. The non-ideal effects of inductor saturation are also illustrated as the inductor current ($I_L$) and the voltage across transistor TSW ($V_{DS}$) experience a measurable change in slope when the saturation points ($P_1$ and $P_2$) are reached. The voltage across resistor $R_S$ (when found in circuit 200) has the same shape as $V_{DS}$.

Figure 4:
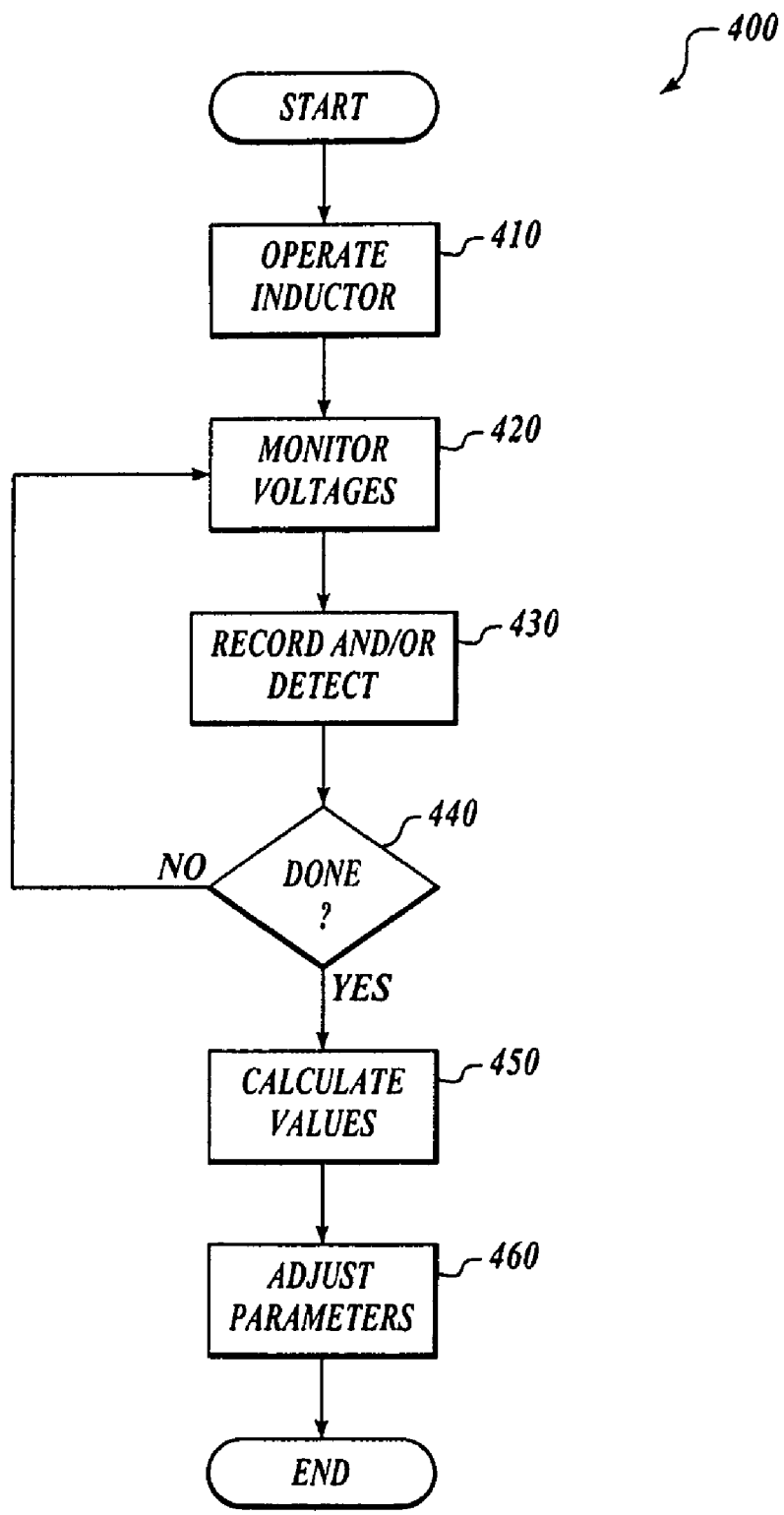
FIG. 4 is an illustration of a procedural flow for an example measurement system.

FIG. 4 is an illustration of a procedural flow for an example measurement system that is arranged according to an aspect of the present invention. After the measurement mode is activated by some triggering event, processing continues at block 410 where the inductor is operated for one or more cycles. At block 420, voltages (e.g., $V_{IN}$, $V_{SW}$, $V_{DS}$, $V_{RS}$, etc.) associated with the inductor are monitored (420) while the inductor is operated. At block 430, the monitored voltages are recorded and/or used to detect the saturation point (depending on the circuit implementation). From decision block 440, the process returns to block 420 when additional monitoring is necessary. Processing continues to block 450 when no additional voltages need be monitored. At block 450 values associated with the inductor (e.g., inductance value, slew rate, saturation point, etc.) are calculated. The calculated values can be used by other circuits or systems to adjust one or more parameters (e.g., current limit, etc).

In one example, voltages are monitored by an analog-type circuit that detects the change in slope associated with the current and/or voltage associated with the inductor. The change in rate associated with the inductor voltages and/or currents indicates that the saturation point has been reached for the inductor. A feedback mechanism can be utilized to activate a clamp circuit or a current limit when the inductor current begins to peak rapidly.

In another example, the inductor voltages are monitored by an analog-to-digital converter. In this example, either the digital values can be recorded in a memory and later retrieved for calculation purposes, or the digital values can be evaluated in real time to determine the rate of change in the voltages. In a further example, the digital values can be processed (e.g., averaged, throwing out extreme values, filtered, etc.) over many operating cycles of the inductor to minimize the effects of noise and switching transients on the measurement values. The processing of the digital values can be provided as a post-processing function or in real-time based on the processing power of the system implementation.

Figure 5:
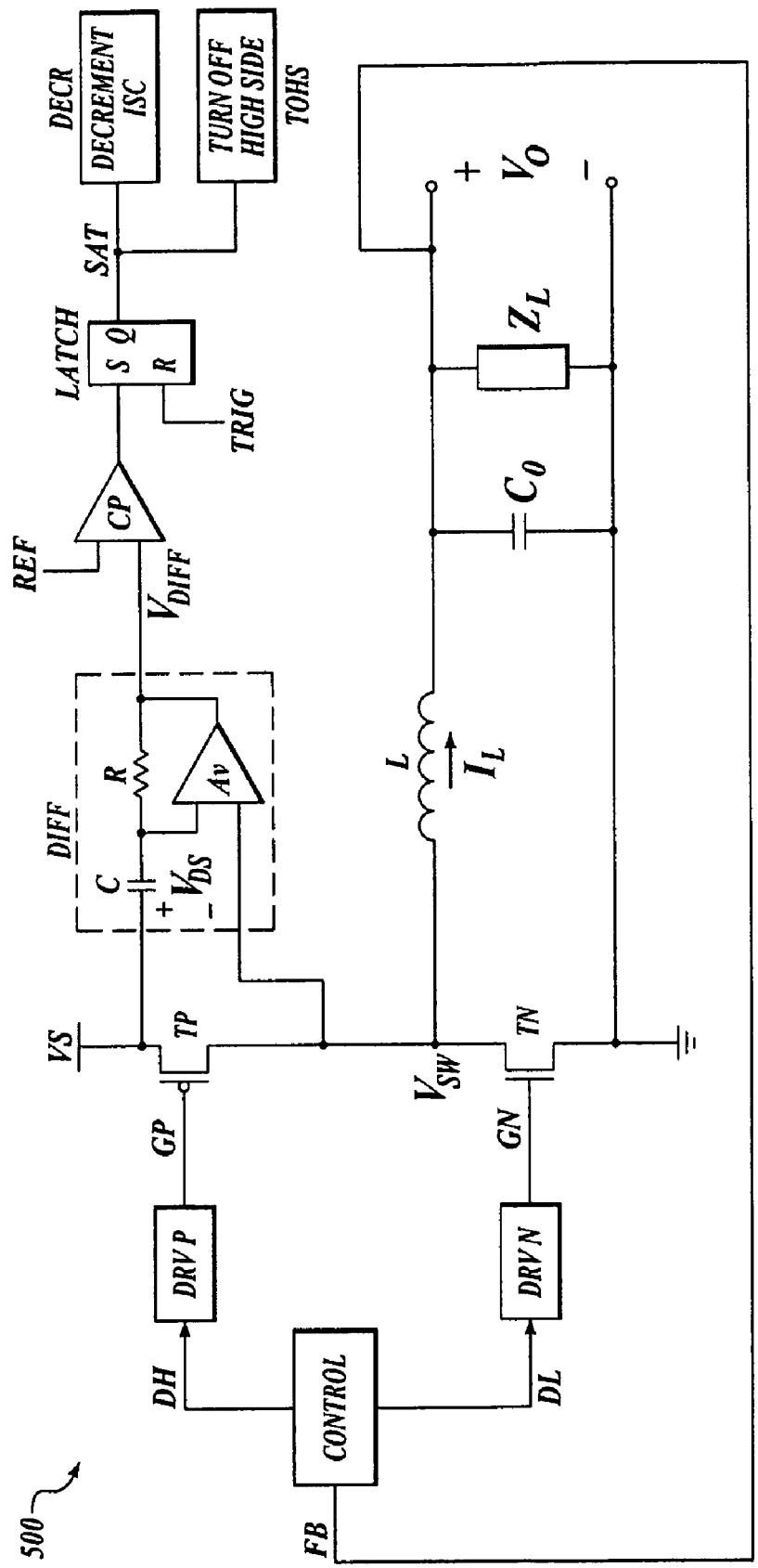
FIG. 5 illustrates another example embodiment of a switching converter with analog differentiator processing system.

FIG. 5 illustrates another example embodiment of a switching converter (500) that is arranged in accordance with an aspect of the present invention. Switching converter 500 is buck-type converter that includes a p-type transistor ($T_P$), and n-type transistor ($T_N$), p and n-type drivers ($DRV_P$, $DRV_N$), a controller (CNTL), a differentiator (DIFF), a comparator (CP), an SR-type latch (LATCH), a decrement circuit (DECR), a high-side turn-off circuit (TOHS), an inductor (L), a capacitor ($C_O$), and a load circuit ($Z_L$).

The controller (CNTL) is arranged to provide drive signals $D_H$ and $D_L$ to drivers $DRV_P$ and $DRV_N$, respectively. Driver DRVP provides a gate control signal ($G_P$) to p-type transistor $T_P$, while driver DRVN provides another gate control signal ($G_N$) to n-type transistor $T_N$. The p-type transistor ($T_P$) is arranged to operate as a high side switch that couples the inductor (L) to the high power source ($V_S$). The n-type transistor ($T_N$) is arranged to operate as a low side switch that couples the inductor (L) to the low power source (GND). Capacitor $C_O$ is coupled in parallel with load circuit $Z_L$, which provide a feedback signal (FB) from $V_O$ to the controller (CNTL).

An example differentiator illustrated in FIG. 5 includes a capacitor (C), a resistor (R), and an amplifier ($A_V$). The differentiator is arranged to monitor the drain-source voltage ($V_{DS}$) of p-type transistor $T_P$ and provide a signal ($V_{DIFF}$) that is proportional to $\Delta V_{DS}/\Delta t$. Comparator CP is arranged to set the SR-type latch when signal $V_{DIFF}$ exceeds a reference level (REF), indicating that inductor L is reaching saturation. The SR-type latch is reset by a trigger signal (TRIGG). The decrement circuit (DECR) is arranged to adjust parameters such as current limit in the circuit such that saturation is avoided. The high-side turn-off circuit (TOHS) is arranged to shut down the high-side switch (transistor $T_P$) to prevent saturation. Other parameter adjustment circuits may also be coupled to the output of the SR-type latch when saturation is detected.

Figure 6:
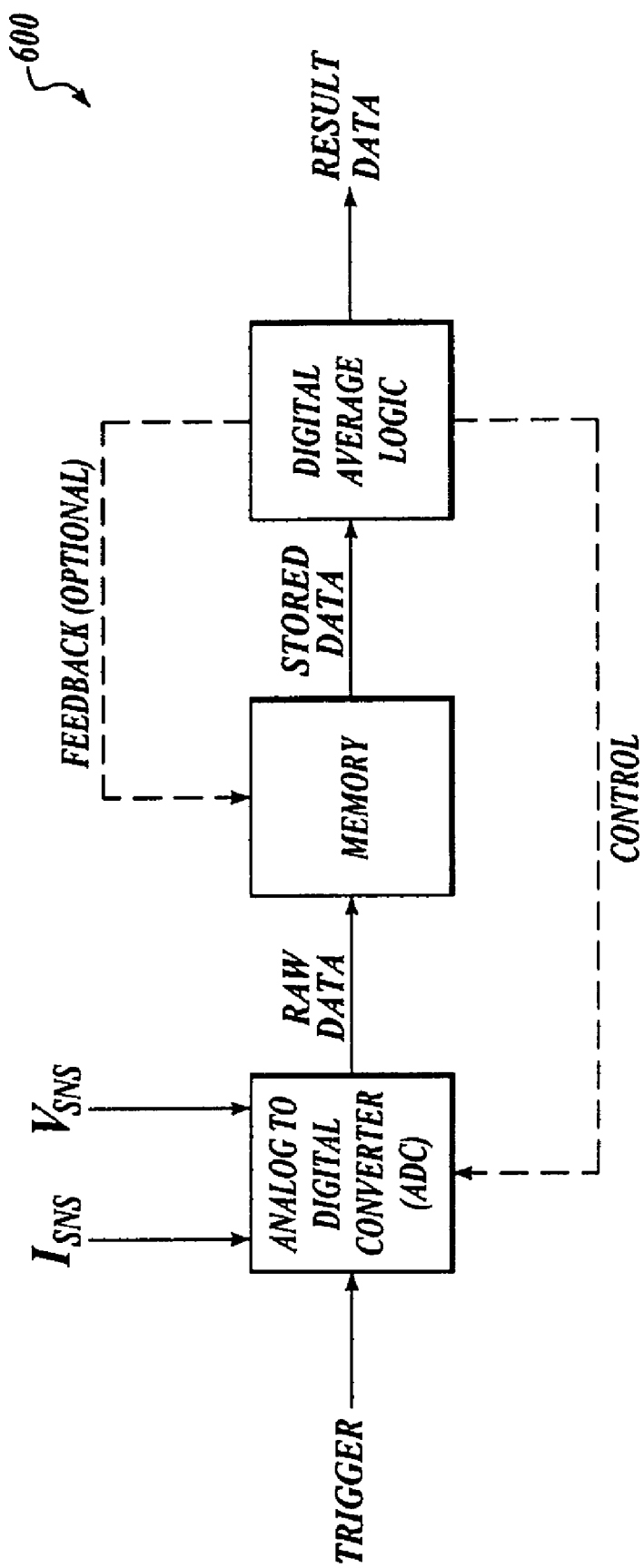
FIG. 6 illustrates an example of a digital processing circuit, arranged in accordance with aspects of the present invention.

FIG. 6 illustrates an example of a digital processing circuit (600) that is arranged in accordance with aspects of the present invention. The digital processing circuit (600) includes an analog-to-digital converter (ADC) circuit, a memory circuit, and a digital processing logic (DPL) circuit. The ADC circuit is activated by a trigger mechanism (TRIGG) and converts a series of measurement signals (ISNS, VSNS, etc) to a data stream (raw data). The data stream is received by the memory circuit for storage. Data in the memory circuit can be retrieved by the DPL circuit for further processing.

In one example, the memory circuit stores sampled data points that are utilized to find the value of $\Delta V_{DS}/\Delta t$, where the DPL circuit is arranged to calculate the value after all of the sampled points are stored. In another example, the memory circuit stores values that correspond to an average value, and the DPL circuit calculates a running average. The DPL circuit can further be arranged to: locate the saturation point of the inductor, filter noise from the sampled data, discard anomalous data from the sampled data points, determine an appropriate current limit, as well as other provide other calculations.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An apparatus for measuring a parameter associated with an inductor in a circuit, the apparatus comprising:
    a transistor that is arranged to selectively couple the inductor to a power source such that the inductor is charged during a charging cycle for the inductor by an input voltage associated with the power source when the transistor is active;
    a voltage sense means that is arranged to sense a first signal associated with the inductor during the charging cycle for the inductor;
    a current sense means that is arranged to sense a second signal;
    a first calculation means that is arranged to determine a first value from the first signal, wherein the first value is associated with a time rate of change of a voltage associated with the inductor during the charging cycle for the inductor;
    a second calculation means for calculating that is arranged to determine a second value from the second signal, wherein the second value is associated with a time rate of change of a current associated with the inductor; and
    a third calculation means that is arranged to calculate the parameter associated with the inductor from the first value and the second value, wherein the third calculation means comprises a digital processing logic that is responsive at least one member of a group consisting of the first value, the second value, the first signal, and the second signal.

2. The apparatus of claim 1 further comprising: an adaptive adjustment means that is arranged to change a control parameter that is associated with the circuit in response to at least one of: the first value, the second value, and the parameter associated with the inductor.

3. The apparatus of claim 1 further comprising: a detection means that is arranged to detect a saturation point in the inductor from at least one of: the first value, the second value, and the parameter associated with the inductor.

4. The apparatus of claim 1 wherein the voltage sense means is arranged to sense the first signal by at least one member of a group consisting of: measuring a voltage across the inductor, measuring a voltage across the transistor, and measuring a voltage across another transistor.

5. The apparatus of claim 1 wherein the voltage sense means corresponds to at least one member of a group consisting of: an analog sense circuit, and an analog-to-digital converter circuit.

6. The apparatus of claim 1, wherein the voltage sense means comprises an analog-to-digital converter that is configured to provide the first signal, and the first calculation means comprises a digital processing logic circuit that is arranged to determine the first value in response to the first signal.

7. The apparatus of claim 1 wherein the current sense means is arranged to sense the second signal by at least one member of a group consisting of: measuring a voltage across another transistor, measuring a voltage across a resistor, measuring a voltage across a series combination of the other transistor and the resistor, and measuring a drain-source voltage across the other transistor.

8. The apparatus of claim 1, wherein the current sense means is at least one member of a group consisting of: an analog sense circuit, and an analog-to-digital converter circuit.

9. The apparatus of claim 1, wherein the current sense means comprises an analog-to-digital converter that is configured to provide the second signal, and the second calculation means comprises a digital processing logic circuit that is arranged to determine the second value in response to the second signal.

10. The apparatus of claim 1, the first calculation means comprising a differentiator circuit that is arranged to sense a drain-source voltage associated with the transistor and provide a diff signal in response to the drain-source voltage.

11. The apparatus of claim 1, wherein the third calculation means comprises a digital processing logic that is arranged to calculate an average value associated with the parameter using a data history associated with at least one member of a group consisting of the first value, the second value, the first signal, and the second signal.

12. The apparatus of claim 1, the third calculation means further comprises a digital processing logic that is arranged to determine at least one member of a group consisting of: a time rate of change associated with at least one of the first value, the second value, the first signal, the second signal, and a saturation point for the inductor based on a change in the slew rate associated with the inductor.

13. An apparatus for measuring a parameter associated with an inductor in a circuit, the apparatus comprising:
a transistor that is arranged to selectively couple the inductor to a power source such that the inductor is charged by an input voltage associated with the power source during a charging cycle for the inductor when the transistor is active;
a control circuit that is arranged to repeatedly activate the transistor such that the inductor is charged over multiple charging cycles;
at least one analog-to-digital converter circuit that is arranged to sense an inductor current and an inductor voltage during the charging cycle of the inductor to provide raw data associated with the inductor, wherein the raw data is a digital representation of the sensed inductor current and the sensed inductor voltage from the charging cycle of the inductor such that a first data signal corresponds to the digital representation of the sensed inductor voltage and a second data signal corresponds to the digital representation of the sensed inductor current;
a memory circuit that is arranged to receive and store the raw data associated with the inductor via the first data signal and the second data signal such that the raw data stored in the memory circuit digitally represents a history of the sensed inductor voltage and the sensed inductor current; and
a digital processing logic that is arranged to communicate with the memory circuit to retrieve stored data, wherein the digital processing logic circuit is further arranged to process the retrieved data for the first data signals and the second data signals to determine: a first value from the first data signal that is associated with a time rate of change of the sensed inductor voltage from the charging cycle of the inductor, a second value form the second data signal that is associated with a time rate of change of the sensed inductor current from the charging cycle for the inductor, and parameters that characterize the inductor based on at least one member of the group consisting of the first value the second value, the first signal, and the second signal.

14. The apparatus of claim 13, wherein the digital processing logic is arranged to adjust parameters for at least one member of a group consisting of: a current limit, a switching time in a switched-mode power supply, a switching time in a buck regulator, a switching time in a boost regulator, a filtered version of the stored data, an inductance value associated with the inductor, a resistance value associated with the inductor, an identification of an inductor type associated with the inductor, a saturation point in the inductor, a compensation adjustment that is associated with the circuit, and a measured slew rate of the inductor.

15. The apparatus of claim 13 further comprising a sense means that is arranged to determine a voltage measurement corresponding to either the inductor current or the inductor voltage during the charging cycle of the inductor.

16. The apparatus of claim 15, wherein the voltage sense means is arranged to determine the voltage measurement from at least one member of a group consisting of: measuring a voltage across the inductor, measuring a drain-source voltage across the transistor, measuring a voltage across a resistor, measuring a voltage across another transistor, measuring a voltage across a series combination of the other transistor and the resistor, and measuring a drain-source voltage across the other transistor.

17. The apparatus of claim 13, wherein the digital processing logic is arranged to calculate an average value associated with a determined parameter using a historical analysis of the stored data.

18. The apparatus of claim 13, wherein the average value corresponds to one member of a group consisting of: an average inductance value for the inductor, an average resistance value for the inductor, an average saturation point for the inductor, and an average slew rate for the inductor.

19. The apparatus of claim 13, wherein the digital processing logic is arranged to evaluate the stored data to identify anomalous data, and discard anomalous data from the stored data.

* * * * *